June 3, 1924. 1,496,547

R. E. KIRSCH

MACHINE FOR CLEANING BRICKS

Filed July 25, 1921

INVENTOR.
Robert E. Kirsch
BY Young and Young
ATTORNEYS.

Patented June 3, 1924.

1,496,547

UNITED STATES PATENT OFFICE.

ROBERT E. KIRSCH, OF MILWAUKEE, WISCONSIN.

MACHINE FOR CLEANING BRICKS.

Application filed July 25, 1921. Serial No. 487,390.

*To all whom it may concern:*

Be it known that I, ROBERT E. KIRSCH, a citizen of the United States, and resident of Milwaukee, in the county of Milwaukee and State of Wisconsin, have invented certain new and useful Improvements in Machines for Cleaning Bricks; and I do hereby declare that the following is a full, clear, and exact description thereof.

My invention relates to certain improvements in brick cleaning machines, and has for its principal object to provide a portable type of the same embodying novel features of simplified construction, arrangement and operation.

Another object of my invention is to provide for a machine of the class set forth, and one embodying a brick feeding mechanism, a cleaning mechanism, and a means for discharging the cleaned bricks from the cleaning mechanism capable of being operated directly from the power plant of the vehicle on which it is to be mounted, as in the case of a self propelled vehicle such as a motor truck, or the same may be drawn or driven from a separate and independent source of power, as in the case of a horse or tractor drawn vehicle.

A further object of the invention is to provide for a machine of the character described, and one comparatively inexpensive in structure and arrangement, combined with simplicity in design and operation, and of high efficiency and great durability.

With the foregoing and other objects in view, the invention resides in the certain novel and useful construction and arrangement of parts as will be hereinafter more fully described, set forth in the appended claims, and illustrated in the accompanying drawing, in which:—

Figure 1:
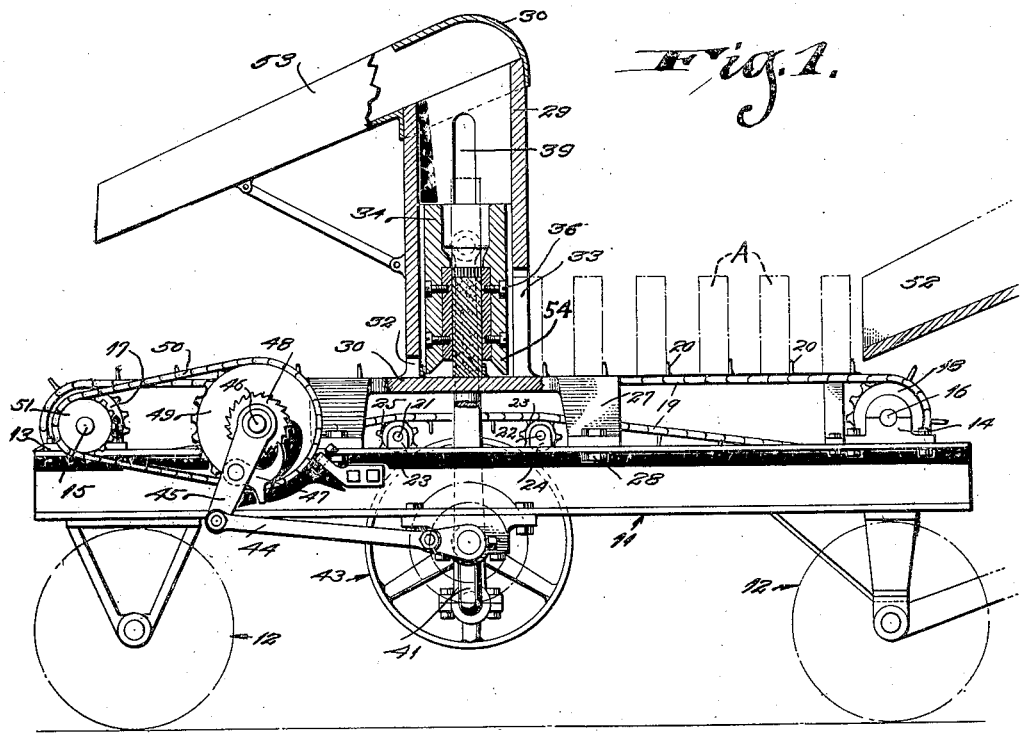
Figure 1 is a preferred embodiment of my machine showing the same in side elevation, partly in section.
Figure 2:
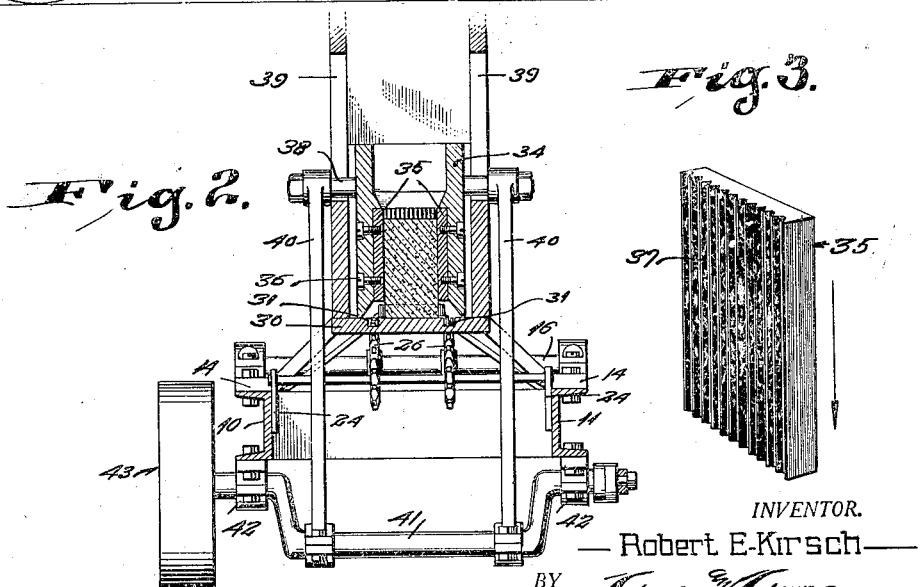
Figure 2 is a fragmentary transverse sectional detail.

Referring to the drawing, the numerals 10 and 11 indicate the oppositely disposed longitudinal side bars of a vehicle frame, running gear, or chassis which is supported on the ground or traction wheels 12. Journalled on and transversely of the opposite ends of the side bars 10 and 11 in suitable bearings 13 and 14 are shafts 15 and 16, respectively, on which are carried pairs of sprocket wheels or gears 17 and 18 around and between which is trained an endless chain conveyor 19 on the outer side of which are mounted a series of equidistantly spaced and transversely extending bars or cleats 20. Extending transversely of the upper faces of the side bars 10 and 11 and spaced apart to either side of the transverse centers thereof are a pair of idlers on the shafts 21 and 22 which are journaled in suitable bearings 23 and 24, respectively, the idlers being in the nature of sprocket wheels or gears 25 and 26 arranged in supporting engagement with the under face of the lower stretch of the endless conveyor 19 whereby to take up the slack in the same.

Rising above the side bars 10 and 11 is a brick cleaning mechanism which comprises a hollow casting formed to provide a base portion 27 bolted on the side bars, as at 28, and a hollow body portion 29 having its lower connected end closed by the top wall 30, of the base 27, which top wall 30 has its upper face grooved as at 31 to allow for the passage therethrough of the opposite chain elements of the endless conveyor 19, the opposite front and rear walls of the body portion 29 being formed to provide openings 32 and 33, respectively, for purposes which will presently be explained.

Figure 3:
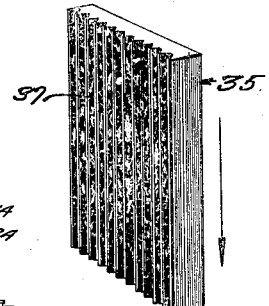
Figure 3 is a perspective view of one of the jaws of the cleaning mechanism.

Mounted for reciprocating movement vertically of the body portion 29 is a cleaning plunger 34, which is in the form of a casing of a cross-sectional shape and area to have free sliding movement within the well of the body portion, and is formed to provide a vertically extending bore substantially oblong in cross-section and of a size to conform to and receive therein a brick to be cleaned. The lower end portion of the bore of the plunger 34 is of an increased area whereby the removable cleaning plates 35 may be secured therein by means of screws or the like 36, the plates having their active faces fluted, or otherwise serrated, as at 37 substantially as shown in Figure 3.

For operating the plunger 34, the same is provided with a pair of oppositely projecting studs 38, which extend outwardly of the body portion through vertically disposed slots 39 formed in the opposite side walls thereof, and are connected to the upper ends of a pair of connecting rods or pitmen 40, the lower ends of which are, in turn, connected to a crank shaft 41. The crank shaft 41 is journaled transversely of the under faces of the side bars 10 and 11 in bearings 42 carried on the latter, and is, as shown, driven from a power driven pulley or the like 43. For transmitting power from the crank shaft 41 to the endless conveyor 19 for its operation, a connecting rod or pitman 44 is provided and the same is connected to a crank arm 45 loosely carried on the projecting end of a stub shaft 46 journaled in suitable bearings of the side bar 11. The crank arm 45 is provided with a dog or pawl 47 which is cooperative with a ratchet wheel 48 fastened on the outer side of a sprocket wheel or gear 49 mounted on the stub shaft 46, and this sprocket wheel or gear 49 is connected, through the medium of a sprocket chain 50 to a sprocket wheel or gear 51 carried on the conveyor shaft 15, the operation of this mechanism being to effect an intermittent feed of the endless conveyor 19 in a forward direction correspondingly with each revolution of said crank shaft 43, and consequently with each complete reciprocation of the cleaning plunger 34. For feeding individual bricks A to be cleaned onto the endless conveyor 19, the machine is adapted to be backed to a position under a chute or the like 52 or the latter may be carried directly in rear of the endless conveyor on the machine and arranged in a forwardly declined position with respect to the latter so as to discharge the bricks A on end, each brick taking positions one between each adjacent pair of the cleats 20, as shown in Figure 1. By this structure, it will be noted that as the plunger moves upwardly, carrying with it a brick which has been cleaned, a brick to be cleaned moves into such a position that it will be forced in between the cleaning plates on the down stroke of the plunger. When this takes place the cleaned brick is forced out of the plunger and into the body portion 29 and then later through a discharge spout or chute 53, which is arranged over the upper open end of said body portion 29. The cleaning of the bricks A, and the feeding of the same to the discharge spout or chute 53 being accomplished on successive down strokes of the plunger 34.

In the operation of the machine thus constructed and arranged, with power applied to the pulley 43, bricks A are fed into the chute 52 and are delivered singly onto the endless conveyor 19 in a manner as to be positioned on the latter in equidistantly spaced relation and on end. With each revolution of the crank shaft 41, the pawl and ratchet mechanism 47, 48 is actuated to feed the endless conveyor step by step in a forward direction, and the bricks A are successively moved into position with the body 29 directly beneath the lower end of the plunger 34 through the rear opening 33 of the body 29, as provided for such purpose, the plunger 34 being timed so as to be in its raised position when the bricks A are moved. With the positioning of a brick A beneath the plunger 34, the same is lowered and the brick A enters the bore of the plunger, the cleaning plates 35 acting to clean the opposite sides of the brick of all adhering portions of cement, mortar or the like. During the upward movement of the plunger 34, the cleaned brick A is retained within the bore of the same, and the endless conveyor 19 is actuated to bring a second uncleaned brick into position beneath the plunger 34 which again moves to lower position and engages the upper end of the positioned brick, when the upper end of the positioned brick being cleaned will force upward on the retained clean brick and will eject the same outwardly of the upper end of the bore of the plunger 34, and upon the upward movement of the latter the first cleaned brick will be discharged outwardly of the discharge spout or chute 53. To assure of the uncleaned positioned brick A being properly engaged by the bore of the plunger 34, the lower end of the latter is flared as at 54 for such purposes, and the upper end of the bore is similarly flared to assure of the proper ejectment and discharge of the clean bricks therefrom.

From the foregoing, it will be readily apparent that the invention provides for an extremely simplified and comparatively inexpensive construction, arrangement and assembly of the parts of the machine, and one of great durability, and efficient in operation, such as constitutes an extremely novel and useful advance in the art to which the same relates.

It is understood that while a preferred embodiment of the machine has been described and illustrated herein in specific terms and details of construction and arrangement of parts, various changes in and modifications of the same may be resorted to without departing from the spirit or sacrificing any of the advantages of the invention.

Having thus fully described my invention, what I claim as new, and desire to secure by Letters Patent, is:—

1. In a brick cleaning machine, a wheel support, a hollow casting mounted thereon, means for intermittingly feeding bricks to said casting, and a reciprocatory cleaning element arranged in said casting and adapted to receive therein a brick to be cleaned on its initial down stroke and ejecting the same therefrom on successive down strokes.

2. In a brick cleaning machine, a wheel support, a hollow casting vertically mounted thereon, a conveyor for intermittingly feeding bricks to said casting, and a reciprocatory cleaning element arranged in said casting, and adapted to receive therein a brick from said conveyor on its initial down stroke and ejecting the same upwardly therefrom on successive down strokes.

3. In a brick cleaning machine, a wheel support, a hollow casting having a base mounted thereon, a conveyor for feeding bricks to said casting and upon said base, a reciprocatory cleaning element arranged in said casting and adapted to receive on its down stroke a brick to be cleaned and to eject the same on its successive down stroke, and means for moving said conveyor step by step and actuating said cleaning element.

In testimony that I claim the foregoing I have hereunto set my hand at Milwaukee, in the county of Milwaukee and State of Wisconsin.

ROBERT E. KIRSCH.